US006603368B1

United States Patent
Leahy et al.

(10) Patent No.: US 6,603,368 B1
(45) Date of Patent: Aug. 5, 2003

(54) HIGH DATA RATE VECTOR DEMODULATOR

(75) Inventors: Ronald S. Leahy, Salt Lake City, UT (US); Randal R. Sylvester, West Valley City, UT (US); James M. Simkins, Park City, UT (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 10/092,865

(22) Filed: Mar. 6, 2002

(51) Int. Cl.[7] .................................................. H03D 3/00
(52) U.S. Cl. ........................ 332/100; 332/103; 329/300; 329/304
(58) Field of Search ................................ 332/100–105; 329/300–306, 345, 346; 375/340–343

(56) References Cited

U.S. PATENT DOCUMENTS 5,555,268 A * 9/1996 Fattouche et al. .......... 375/206
6,511,280 B1 * 1/2003 Sammartino et al. ....... 414/784

* cited by examiner

Primary Examiner—Kenneth B. Wells
(74) Attorney, Agent, or Firm—Perman & Green, LLP

(57) ABSTRACT

A demodulator for demodulating clear mode waveforms such as Phase Shift Keyed and Quadrature Amplitude Modulated waveforms, is capable of demodulating signals with much greater data rates than the clock rate of the device in which the demodulator resides by converting serial input samples into vectors. The input vectors are converted to "soft-decision" (data estimate) vectors which are input to a parallel-to-serial multiplexer, and the vector elements are output serially at the symbol clock rate to represent demodulated data. In the preferred embodiment, the vector demodulator at least includes a preprocessor, a digital phase shifter, and a symbol demodulator which, inter alia, outputs a phase rotator command signal to control the carrier recover phase rotation process in the digital phase shifter. As a result, the maximum symbol rate—and hence the maximum data rate—is raised up to N times the device maximum clock rate for waveforms such as Biphase Shift Keying, where N represents the number of data elements in the vectors, and 2N for waveforms such as Quadrature Phase Shift Keyed. The data rate is increased by a factor of N for one sample per symbol, and by a factor of N/2 for 2 samples per symbol, etc.

20 Claims, 2 Drawing Sheets

HIGH DATA RATE VECTOR DEMODULATOR

FIELD OF THE INVENTION

The present invention broadly relates to demodulators in general, and to demodulators for high-speed data transmission using clear mode communication methods in particular.

BACKGROUND OF RELATED ART

As is well known in communication systems, modulation involves varying a high-frequency carrier wave in a predefined way so that the variations correspond to the information content of an information signal. A new variation to the carrier wave is often introduced to correspond to each new sample of the information signal. In order for a receiver to obtain the information signal, a transmitted carrier wave is demodulated.

While a demodulator may be a discrete circuit, it is typically incorporated in a receiver chip. A clock signal controls the timing of the demodulator. In prior art demodulators, a sample from the received signal can be obtained at a rate up to the maximum clock rate. For example, if the maximum demodulator clock rate is 200 megahertz, the demodulator can demodulate an information signal with a sample rate up to 200 megahertz.

If the information signal sample rate exceeds the maximum clock rate of a prior art demodulator, the demodulator either does not function, or produces a demodulated signal which is not a duplicate of the original information signal, but one that is either interpolated or a low-resolution facsimile. For example, if the information signal is 1.2 gigahertz and the maximum demodulator clock rate is 200 megahertz, a functioning demodulator will produce only 1 for every 6 original samples. While this may be sufficient for some operations, such as when a low-resolution video signal is needed, it is not acceptable for other operations where the demodulated samples need a much higher correlation with the original samples.

The aforementioned problems can be eliminated, of course, by providing a much higher demodulator clock rate. However, the demodulator circuitry would be more expensive. At least with respect to unspread (clear) modes of communication such as Phase Shift Keyed (PSK) or Quadrature Amplitude Modulated (QAM) waveforms, there is a great need to provide a demodulator that can, if needed, demodulate an information signal having a sample rate exceeding the demodulator's maximum clock rate, while still outputting a demodulated signal with a high degree of fidelity to the original information signal.

SUMMARY OF THE INVENTION

In view of the above-identified problems and limitations of the prior art, the present invention provides a method of demodulating data signal waveforms via a demodulator residing in a device. The method at least includes the steps of serially receiving an input waveform with a symbol rate M, converting said input waveform into input vectors, each vector having a predetermined number of samples, and for each device clock period, where the maximum device clock speed is R, processing an input vector by making soft decisions to demodulate said input vectors into output vectors containing data estimates as elements, and outputting the elements of said output vectors as demodulated data. For the above-described method, the value of M is greater than the value of R.

The present invention also provides a demodulator residing in a device, said demodulator adapted to demodulate data signal waveforms. The demodulator at least includes an input adapted to serially receive an input waveform with a symbol rate M, a serial-to-parallel multiplexer adapted to convert said input waveform into input vectors, each vector having a predetermined number of samples, and a vector demodulator adapted to, for each device clock period, where the maximum device clock speed is R, process an input vector by making soft decisions to demodulate said input vectors into output vectors containing data estimates as elements. The demodulator also at least includes a parallel-to-serial multiplexer adapted to output the elements of said output vectors as demodulated data. For the above-described demodulator, the value of M is greater than the value of R.

The present invention is described in detail below, with reference to the drawings.

BRIEF DESCRIPTION OF THE DRAWINGS

Features and advantages of the present invention will become apparent to those skilled in the art from the following description with reference to the drawings, in which.

DETAILED DESCRIPTION OF THE PREFERRED EMBODIMENTS

To address the limitations associated with the prior art, the present-inventive high data rate digital demodulation process first converts the modulated waveform into input vectors, each having N samples. In the preferred embodiment, one vector is formed for each device clock period. The input vectors are demodulated to produce output vectors with soft-decision data estimates. The elements of the output vectors are clocked out to produce a serial stream of soft-decision demodulated data. As a result, the demodulation process of the present invention is able to demodulate waveforms with symbol rates greater than that of the clock rate of the demodulation hardware, so that for some waveforms, the symbol rate can be up to N times that of the device clock rate.

Figure 1:
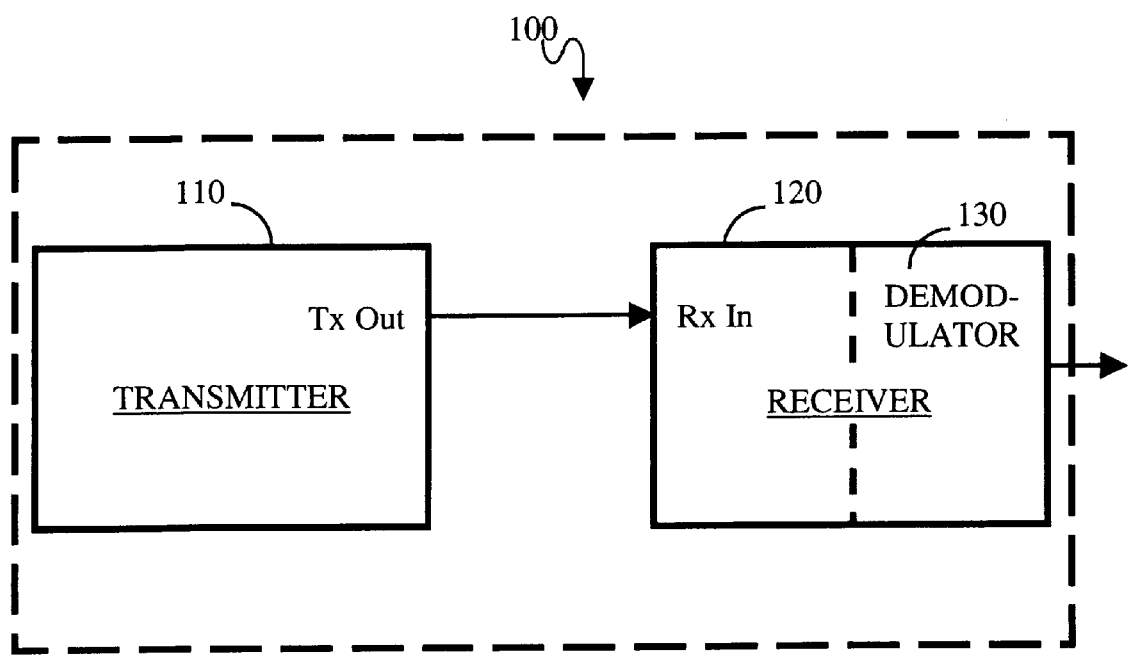
FIG. 1 is a general block diagram of a communication system utilizing a demodulator constructed according to the present invention.

FIG. 1 illustrates a basic communication system 100 which nominally includes a transmitter 110 capable of generating a clear mode (unspread) data waveform, such as PSK or QAM, and a receiver 120 having a demodulator 130 constructed according to the present invention.

Figure 2:
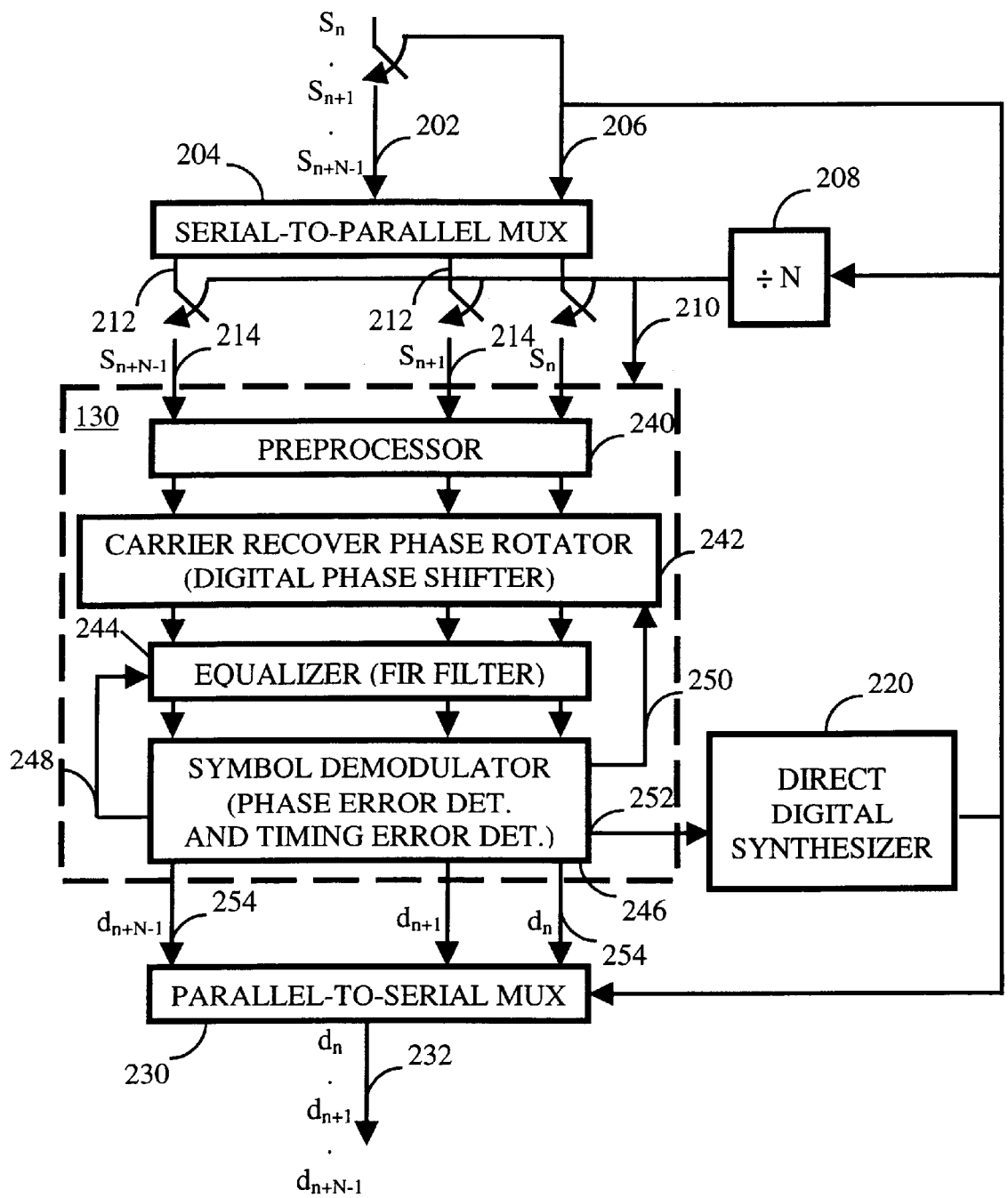
FIG. 2 is a detailed schematic block diagram of one embodiment of the present-inventive demodulator.

The present-inventive demodulator 130 is shown in greater detail in FIG. 2. In the preferred embodiment, the demodulator is implemented in a Field Programmable Gate Array (FPGA). However, it will be appreciated by those skilled in the art that the present-inventive demodulator can be implemented in other ways, including but not limited to, Application Specific Integrated Circuits (ASICs).

In an example of the present invention, a received signal S(t) is sampled at a rate of one or two samples per symbol period. The samples ($S_n \ldots S_{n+N-1}$) are serially presented to the input 202 of a serial-to-parallel multiplexer 204. From there, vectors each having N accumulated samples are formed, with the number N being a matter of design choice. A timing signal divided by a divider 208 triggers (via line 210) the multiplexer 204 to output the input vectors via switches and lines 212 and 214, respectively, at the rate of 1/Nth of the symbol rate for each sample in a vector if sampling one time per symbol.

The input vector is filtered by a preprocessor 240, and then rotated by a digital phase shifter 242 as needed to further process the input vector and remove remaining phase errors and vestiges of the carrier wave. In the preferred embodiment, the output of the digital phase shifter is passed through an adaptive Finite Impulse Response (FIR) filter 244 serving as an equalizer. The filter 244 removes Inter Symbol Interference, as will be appreciated by those skilled in the art.

A symbol demodulator 246 produces an output vector with soft-decision data estimates. As opposed to hard decision logic that relies upon inviolate rules of determining data values, soft decision logic attempts to produce data values according to the maximum likelihood that a received value is in fact one particular value. Many methods that approximate a maximum likelihood can be used without departing from the scope of the present invention.

In addition to demodulation as described above, the symbol demodulator 246 also controls the operation of the digital phase shifter 242 and the equalizer 244 as previously mentioned. The phase rotator command output to the digital phase shifter 242 is generated by the phase error and timing error detectors in the symbol demodulator 246.

The data estimates produced from soft decisions by the vector demodulator 246 are output in the form of an output vector via lines 254 to a parallel-to-serial multiplexer 230. Finally, the data estimates are serially output by the multiplexer 230 via an output line 232. A direct digital synthesizer 220 may be used to supply the symbol clock rate to the multiplexers 204 and 230 under the control of the symbol demodulator 246. From FIG. 2, it can be seen that the symbol clock rate is also supplied to the divider circuit 208. When more than one sample per symbol is available the timing recovery can be accomplished using a free-running oscillator instead of a direct digital synthesizer.

In addition to the multiplexers, other circuitry outside of the vector demodulator typically operates at the sample rate (N times the demodulator device clock rate).

As an example of how data throughput rates are raised beyond the maximum clock rate of the present-inventive vector demodulator, Table 1 summarizes some expected results achievable by the present-inventive vector demodulator for different waveforms. That is, the maximum throughput rates as a function of selective modulated waveforms. For convenience, it is assumed that the maximum device clock rate is 200 megahertz, and that the number of samples in each vector is 6. The resulting throughput data rate is listed for each type of waveform under the sample rate column (i.e., 2 samples per symbol period, or 1 sample per symbol period).

TABLE 1

| Waveform type | 2 Samples/Symbol | 1 Sample/Symbol |
| --- | --- | --- |
| BPSK | 0.6 Gigabits per sec. | 1.2 Gigabits per sec. |
| QPSK | 1.2 Gigabits per sec. | 2.4 Gigabits per sec. |
| 8PSK | 1.8 Gigabits per sec. | 3.6 Gigabits per sec. |
| 16PSK | 2.4 Gigabits per sec. | 4.8 Gigabits per sec. |
| 16QAM | 2.4 Gigabits per sec. | 4.8 Gigabits per sec. |

In addition to the previously mentioned PSK and QAM waveforms, other waveforms can also be included.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A method of demodulating data signal waveforms via a demodulator residing in a device, said method comprising the steps of:
   a) serially receiving an input waveform with a symbol rate M;
   b) converting said input waveform into input vectors, each vector having a predetermined number of samples;
   c) for each device clock period, where the maximum device clock speed is R, processing an input vector by making soft decisions to demodulate said input vectors into output vectors containing data estimates as elements; and
   d) outputting the elements of said output vectors as demodulated data;
   wherein M is greater than R.

2. The method in claim 1, wherein said data signal waveforms are modulated using Phase Shift Keying.

3. The method in claim 1, wherein said data signal waveforms are modulated using Quadrature Amplitude Modulation.

4. The method in claim 1, wherein said data signal waveforms contain one sample per symbol period.

5. The method in claim 1, wherein said data signal waveforms contain at least two samples per symbol period.

6. The method in claim 1, wherein step c) also comprises the step of preprocessing said input vectors to provide matched filtering and remove DC bias levels in said input vectors.

7. The method in claim 1, wherein step c) also comprises the step of, via a digital phase shifter, removing any residual carrier signal in said input vectors and phase errors.

8. The method in claim 7, wherein step c) also comprises the step of, via a symbol demodulator having a phase error detector and a phase loop filter, outputting to said digital phase shifter, a phase rotator command signal, wherein said digital phase shifter is responsive thereto.

9. The method in claim 8, wherein step c) also comprises the step of, via an equalizer, minimizing the effects of Inter Symbol Interference in the output of said digital phase shifter.

10. The method in claim 9, further comprising the step of controlling said equalizer via said symbol demodulator.

11. A demodulator residing in a device, said demodulator adapted to demodulate data signal waveforms, and said demodulator comprising:
   an input adapted to serially receive an input waveform with a symbol rate M;
   a serial-to-parallel multiplexer adapted to convert said input waveform into input vectors, each vector having a predetermined number of samples;
   a vector demodulator adapted to, for each device clock period, where the maximum device clock speed is R, process each input vector to generate an output vector containing soft-decision data estimates as elements; and
   a parallel-to-serial multiplexer adapted to output the elements of said output vectors as demodulated data;
   wherein M is greater than R.

12. The demodulator in claim 11, wherein said data signal waveforms are modulated using Phase Shift Keying.

13. The demodulator in claim 11, wherein said data signal waveforms are modulated using Quadrature Amplitude Modulation.

14. The demodulator in claim 11, wherein said data signal waveforms contain one sample per symbol period.

15. The demodulator in claim 11, wherein said data signal waveforms contain at least two samples per symbol period.

16. The demodulator in claim 11, wherein said vector demodulator also comprises a preprocessor adapted to preprocess said input vectors to provide matched filtering and remove DC bias levels in said input vectors.

17. The demodulator in claim 11, wherein said vector demodulator also comprises a digital phase shifter adapted to remove any residual carrier signal in said input vectors and phase errors.

18. The demodulator in claim 17, wherein said vector demodulator also comprises a symbol demodulator having a phase error detector and a phase loop filter, said symbol demodulator adapted to output to said digital phase shifter, a phase rotator command signal, wherein said digital phase shifter is responsive thereto.

19. The demodulator in claim 18, wherein said vector demodulator also comprises an equalizer adapted to minimize the effects of Inter Symbol Interference in the output of said digital phase shifter.

20. The demodulator in claim 19, wherein said symbol demodulator is further adapted to control said equalizer.

* * * * *